(12) United States Patent
Coffey et al.

(10) Patent No.: US 10,911,447 B2
(45) Date of Patent: Feb. 2, 2021

(54) APPLICATION ERROR FINGERPRINTING

(71) Applicant: SAP SE, Walldorf (DE)

(72) Inventors: Paul Coffey, San Francisco, CA (US); Hao Weng, Shanghai (CN); Jiayi Chen, Shanghai (CN); Na Zhang, Shanghai (CN)

(73) Assignee: SAP SE, Walldorf (DE)

( * ) Notice: Subject to any disclaimer, the term of this patent is extended or adjusted under 35 U.S.C. 154(b) by 143 days.

(21) Appl. No.: 15/730,980

(22) Filed: Oct. 12, 2017

(65) Prior Publication Data
US 2019/0116178 A1    Apr. 18, 2019

(51) Int. Cl.
| | | |
|---|---|---|
| H04L 29/06 | (2006.01) | |
| G06F 11/14 | (2006.01) | |
| G06F 21/16 | (2013.01) | |
| H04L 9/32 | (2006.01) | |
| G06F 21/57 | (2013.01) | |
| G06F 11/07 | (2006.01) | |
| H04L 12/24 | (2006.01) | |

(52) U.S. Cl.
CPC ...... *H04L 63/0876* (2013.01); *G06F 11/0751* (2013.01); *G06F 11/0775* (2013.01); *G06F 11/0787* (2013.01); *G06F 11/1492* (2013.01); *G06F 21/16* (2013.01); *G06F 21/577* (2013.01); *H04L 9/3231* (2013.01); *H04L 9/3239* (2013.01); *H04L 41/5074* (2013.01); *G06F 11/079* (2013.01); *G06F 2201/83* (2013.01); *H04L 63/1416* (2013.01); *H04L 2209/34* (2013.01)

(58) Field of Classification Search
CPC ............ H04L 63/0876; H04L 63/1416; G06F 11/1492; G06F 21/16
See application file for complete search history.

(56) References Cited

U.S. PATENT DOCUMENTS

| | | | | |
|---|---|---|---|---|
| 7,860,768 B2 * | 12/2010 | Herter | ................. | G06F 11/0709 705/35 |
| 8,595,553 B2 * | 11/2013 | Goertler | ................. | G16H 40/40 714/26 |
| 9,037,922 B1 * | 5/2015 | Cabrera | ................. | G06F 11/07 714/47.1 |

(Continued)

*Primary Examiner* — Eleni A Shiferaw
*Assistant Examiner* — Bassam A Noaman
(74) *Attorney, Agent, or Firm* — Buckley, Maschoff & Talwalkar LLC

(57) ABSTRACT

An application error detection platform computer processor may monitor execution of an application for a customer and determine that an application error has occurred. Responsive to the determination that an application error has occurred, an error fingerprint creation platform computer processor may access a stack trace representing execution of the application when the application error occurred. An error fingerprint associated with the occurrence of the application error may then be determined by applying a hash function (e.g., SHA-1) to information contained in the stack trace. Electronic records including an indication of the error fingerprint may then be received by and stored in an application error log data store. The application error log data store may then be searched for duplicate error fingerprints to facilitate application error resolution.

14 Claims, 17 Drawing Sheets

(56) References Cited

U.S. PATENT DOCUMENTS

| | | | |
|---|---|---|---|
| 2003/0005414 A1* | 1/2003 | Elliott | G06F 11/0715 |
| | | | 717/128 |
| 2008/0172583 A1* | 7/2008 | Mahajan | G06F 11/3672 |
| | | | 714/57 |
| 2010/0223499 A1* | 9/2010 | Panigrahy | G06F 11/0709 |
| | | | 714/19 |
| 2012/0246625 A1* | 9/2012 | Puthuff | G06F 11/3636 |
| | | | 717/130 |
| 2015/0095338 A1* | 4/2015 | Baggott | G06F 11/3476 |
| | | | 707/740 |
| 2015/0355998 A1* | 12/2015 | Kogan-Katz | G06F 11/366 |
| | | | 717/101 |
| 2018/0032862 A1* | 2/2018 | Oliner | G06N 3/0445 |

* cited by examiner

| ERROR ID 1002 | DATE (TIME) 1004 | APPLICATION ID 1006 | CUSTOMER ID 1008 | ERROR FINGERPRINT 1010 | STATUS 1012 |
|---|---|---|---|---|---|
| E_101 | 3/8/2019 (13:32:03.000) | A_101 | C_101 | FE249A362824E... | RESOLVED |
| E_102 | 3/9/2019 (01:19:58.000) | A_102 | C_101 | 862A328DC002... | PENDING |
| E_103 | 3/9/2019 (06:42:35.000) | A_101 | C_102 | FE249A362824E... | MATCHED WITH E_101 |

APPLICATION ERROR FINGERPRINTING

BACKGROUND

Some embodiments disclosed herein relate to applications and, more particularly, to systems and methods associated with application error fingerprinting.

An enterprise may arrange to execute an application for one or more customers. For example, the enterprise might arrange to execute an application to help the customer process purchase orders, manage a Human Resources ("HR") or payroll department, etc. In some cases, an application error might occur during execution. For example, a programming error or unforeseen circumstance might cause the application to stop execution. When this occurs, an Information Technology ("IT") operator working for the enterprise might investigate the situation and provide a correction (e.g., a software update to the application that will prevent the error from occurring in the future). Note that a single application error might occur multiple times (e.g., in connection with various users, customers, etc.). As a result, the enterprise might spend time investigating a problem that has already been resolved. Moreover, it can be difficult for an enterprise to determine which application errors frequently occur (to facilitate an allocation of resources to such errors). It would therefore be desirable to efficiently and accurately facilitate creation of an application error fingerprint to help identify similar application errors.

SUMMARY

Some embodiments facilitate creation of an application error fingerprint to help identify similar application errors. An application error detection platform computer processor may monitor execution of an application for a customer and determine that an application error has occurred. Responsive to the determination that an application error has occurred, an error fingerprint creation platform computer processor may access a stack trace representing execution of the application when the application error occurred. An error fingerprint associated with the occurrence of the application error may then be determined by applying a hash function (e.g., SHA-1) to information contained in the stack trace. Electronic records including an indication of the error fingerprint may then be received by and stored in an application error log data store. The application error log data store may then be searched for duplicate error fingerprints to facilitate application error resolution.

Some embodiments comprise: means for monitoring, by an application error detection platform computer processor, execution of an application for a customer; means for determining, by the application error detection platform computer processor, that an application error has occurred; responsive to the determination that an application error has occurred, means for accessing, by an error fingerprint creation platform computer processor, a stack trace representing execution of the application when the application error occurred; means for determining, by the error fingerprint creation platform computer processor, an error fingerprint associated with the occurrence of the application error by applying a hash function to information contained in the stack trace; and means for storing electronic records including the indication of the error fingerprint in an application error log data store.

Technical effects of some embodiments of the invention are improved and computerized ways to efficiently and accurately facilitate creation of an application error fingerprint to help identify similar application errors. With these and other advantages and features that will become hereinafter apparent, a more complete understanding of the nature of the invention can be obtained by referring to the following detailed description and to the drawings appended hereto.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
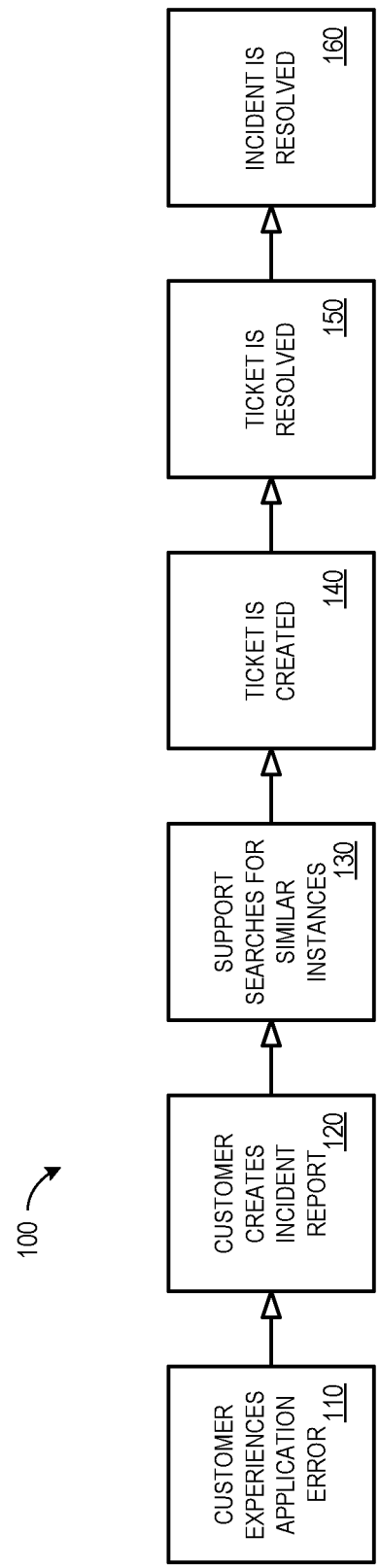
FIG. 1 illustrates an application error resolution process.

An enterprise may arrange to execute an application for one or more customers. For example, the enterprise might arrange to execute an application to help the customer process purchase orders, manage a HR or payroll department, etc. In some cases, an application error might occur during execution. For example, a programming error or unforeseen circumstance might cause the application to stop execution. When this occurs, an IT operator working for the enterprise might investigate the situation and provide a correction (e.g., a software update to the application that will prevent the error from occurring in the future). For example, FIG. 1 illustrates an application error resolution process 100. At 110, a customer may experience an application error and at 120 the customer may create an incident report (e.g., via a web portal maintained by an enterprise). At 130, the enterprise may search for similar instances (to avoid duplicating debugging efforts). This might include, for example, looking for other incidents with similar descriptions. At 140 an application error "ticket" is created. The ticket may, for example, by used to track a problem throughout the process 100 (e.g., to determine how long it typically takes for problems to be corrected). As used herein, the term "ticket" might be associated with any Issue Tracking System ("ITS"), trouble ticket system, support ticket, incident ticket, etc. The ticket may be associated with a platform or software package that manages and maintains lists of issues for the enterprise. The ticket may be used to create, update, and/or resolve reported customer issues. At 150, the ticket is resolved (e.g., by identifying the cause of the application error and arranging for the problem to be corrected). At 150, the incident may finally be resolved.

Figure 2:
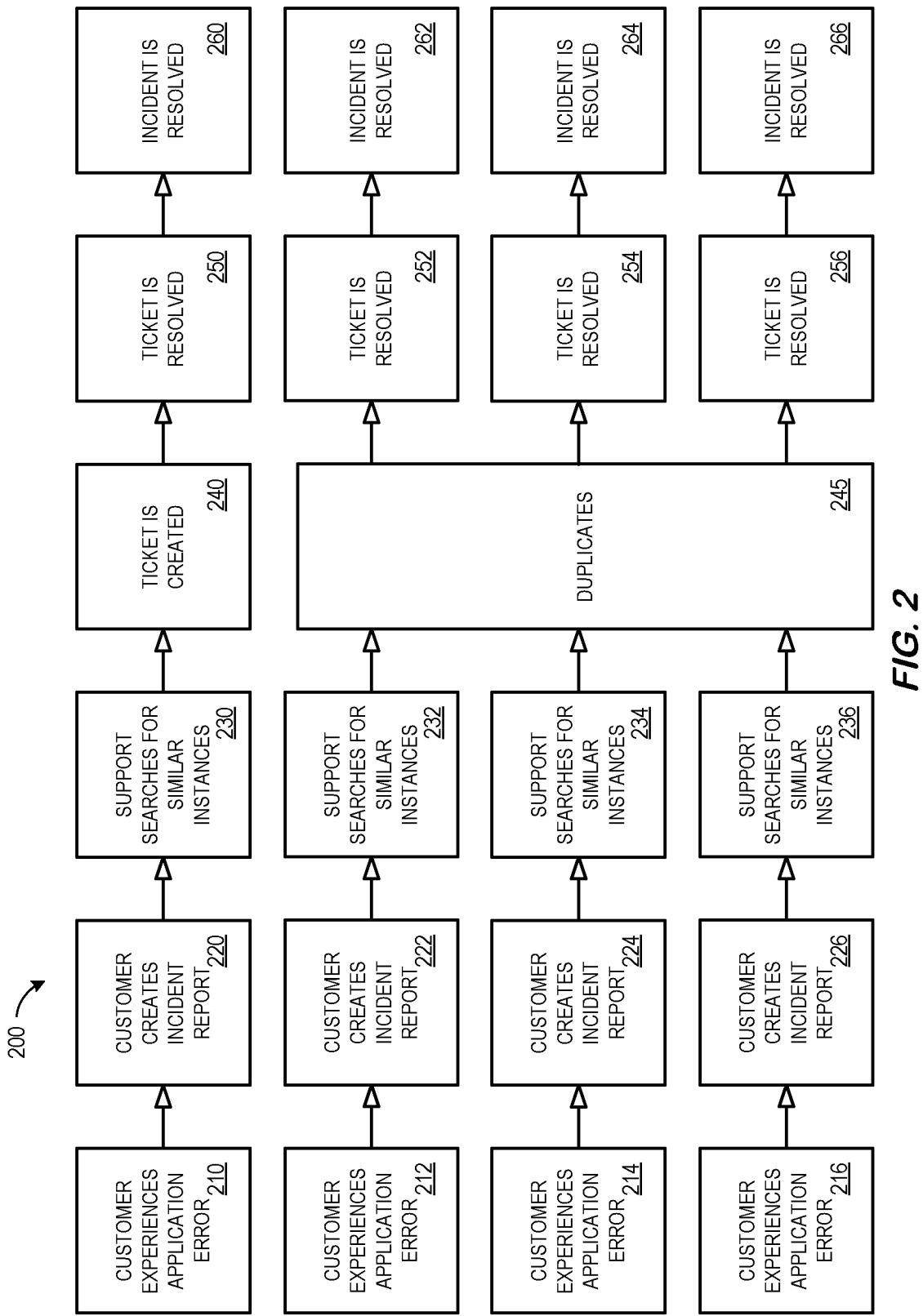
FIG. 2 illustrates an application error resolution process for multiple errors.

Note that a single application error might occur multiple times (e.g., in connection with various users, customers, etc.). As a result, the enterprise might spend time investigating a problem that has already been resolved. Moreover, it can be difficult for an enterprise to determine which application errors frequently occur (to facilitate an allocation of resources to such errors). FIG. 2 illustrates an application error resolution process 200 for multiple errors. As before, at 210 a customer may experience an application error, and at 220 the customer may create an incident report. At 230, the enterprise may search for similar instances (to avoid duplicating debugging efforts). As illustrated in FIG. 2, these steps can be repeated multiple times when customers experience multiple errors (e.g., at steps 212, 214, 216, etc.). At 240, an application error "ticket" is created. Note that if duplicate incidents are not detected at 245, multiple tickets may be created that need to be independently resolved at 250, 252, 254, 256 before the incidents are resolved at 260, 262, 264, 266.

Figure 3:
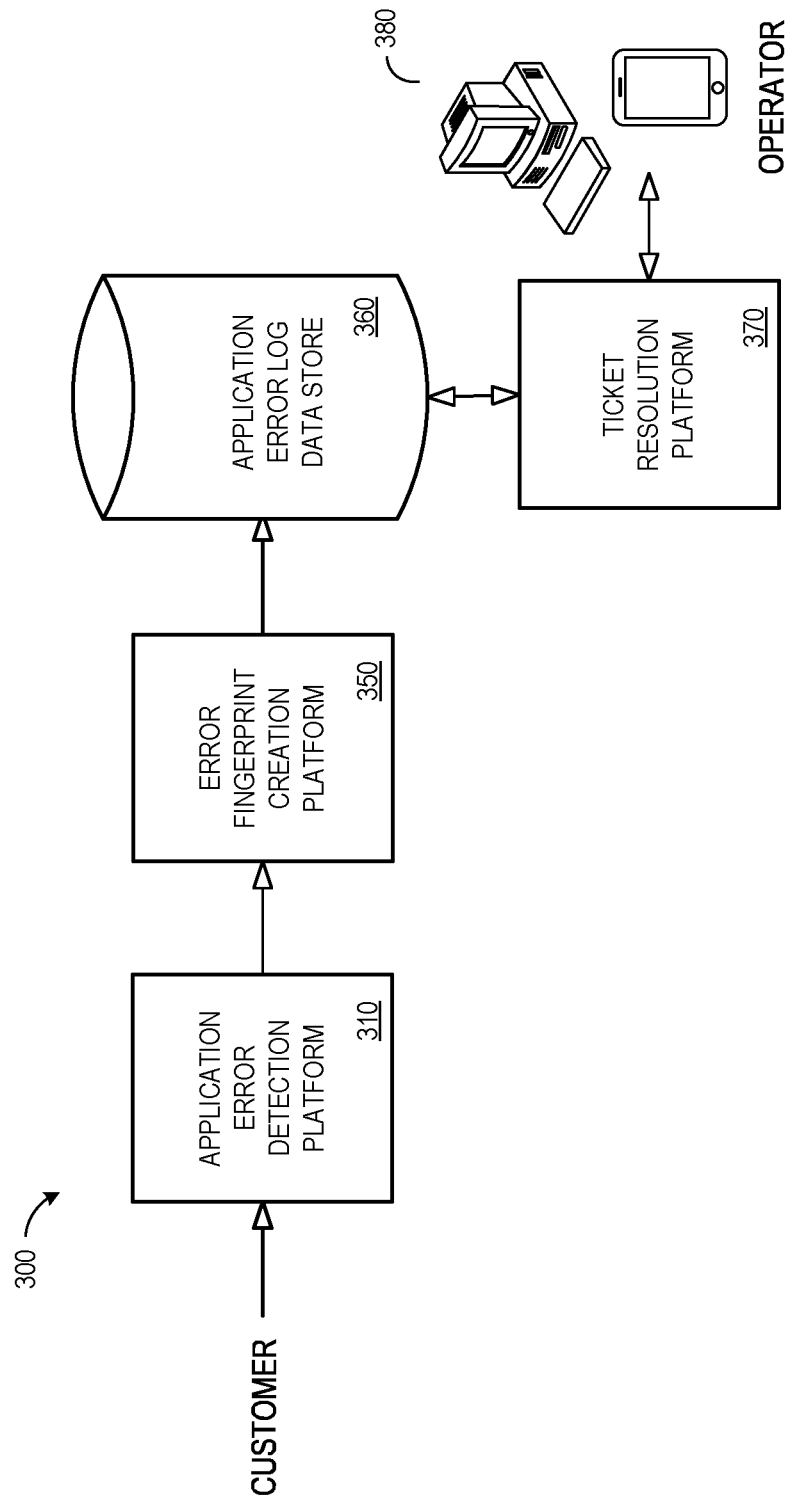
FIG. 3 is high level overview of a system according to some embodiments.

To avoid such a result, it would therefore be desirable to efficiently and accurately facilitate creation of an application error fingerprint to help identify similar application errors. FIG. 3 is high level overview of a system 300 according to some embodiments. An application error detection platform 310 might determine that an application error has occurred. This might comprise a customer reporting the occurrence to the application error detection platform 310, an automated detection system, etc. An error fingerprint creation platform 350 may then generate a fingerprint associated with the application error that can be stored into an application error log data store 360. A ticket resolution platform 370 may then access the information in the application error log data store 360 to help an IT operator at a remote device 380 identify similar problems.

The error fingerprint creation platform 350 and/or other elements of the system might be, for example, associated with a Personal Computer ("PC"), laptop computer, a tablet computer, a smartphone, an enterprise server, a server farm, and/or a database or similar storage devices. According to some embodiments, an "automated" error fingerprint creation platform 350 may help resolve application errors. As used herein, the term "automated" may refer to, for example, actions that can be performed with little (or no) intervention by a human.

As used herein, devices, including those associated with the error fingerprint creation platform 350 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The error fingerprint creation platform 350 may store information into and/or retrieve information from data stores such as the application error log data store 360. The data stores might, for example, store electronic records representing laser power levels, calibration curves, predicted performance, etc. The data stores may be locally stored or reside remote from the error fingerprint creation platform 350. Although a single application error detection platform and error fingerprint creation platform 350 are shown in FIG. 3, any number of such devices may be included. Moreover, various devices described herein might be combined according to embodiments of the present invention. For example, in some embodiments, the error fingerprint creation platform 350 and ticket resolution platform 370 (and/or other devices) might be co-located and/or may comprise a single apparatus.

Figure 4:
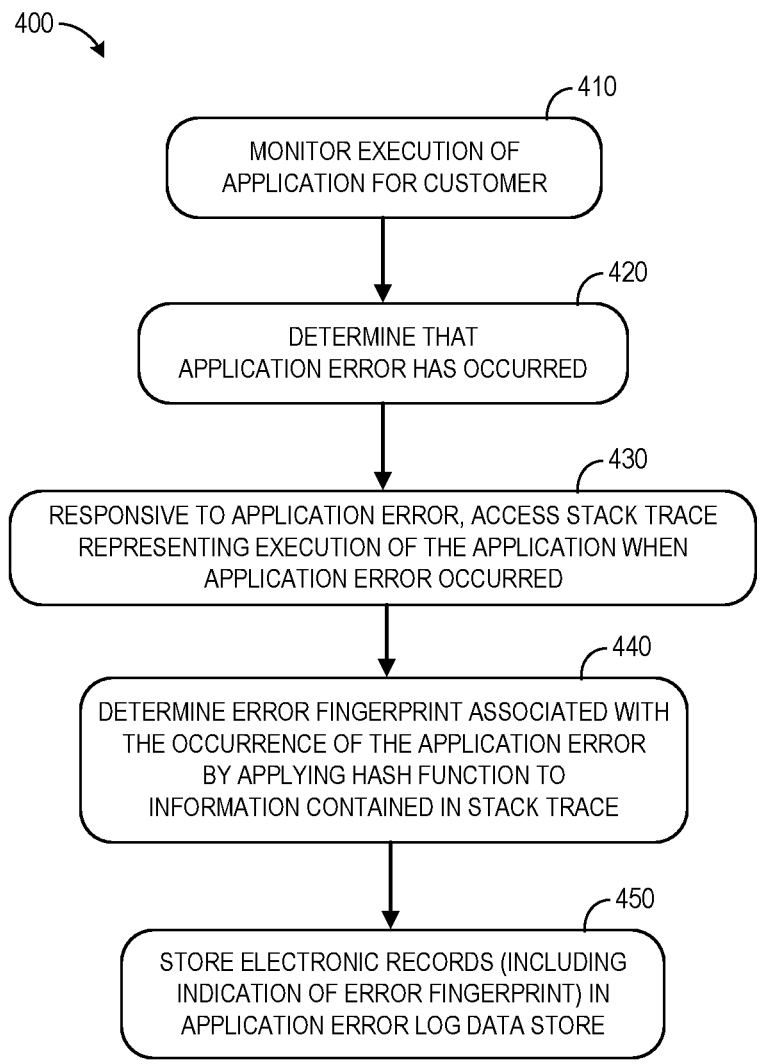
FIG. 4 is a method in accordance with some embodiments.

According to some embodiments, the elements of the system 300 automatically facilitate creation of an application error fingerprint to help identify similar application errors. For example, FIG. 4 illustrates a method 400 that might be performed according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 410, an application error detection platform computer processor may monitor execution of an application for a customer. Note that multiple applications and/or multiple customers (e.g., each of which might be associated with multiple users) may be monitored in accordance with any of the embodiments described herein. Moreover, a single application might be executing on multiple host servers. At 420, the application error detection platform computer processor may determine that an application error has occurred. As used herein, the phrase "application error" might refer to any problem that might need to be resolved including, for example, code breaks, runtime exceptions, etc.

Responsive to the determination that an application error has occurred, at 430 an error fingerprint creation platform computer processor may access a stack trace representing execution of the application when the application error occurred. As used herein, the phrase "stack trace" (or stack backtrace or stack traceback) may refer to, for example, a report of active stack frames at a certain point in time during the execution of a program. When a program is run, memory may be dynamically allocated in a stack and a heap (e.g., memory may be contiguously allocated on a stack but not on a heap) and this stack may be referred to as a program's runtime stack. Note that once a block of memory has been allocated on the stack, it might not be easily removed (e.g., because other blocks of memory may have been previously allocated). Each time a function is called in a program, a block of memory may be allocated on top of the runtime stack (e.g., for the function's parameters and local variables declared in the function). Programmers may utilize the stack trace to help debug an application error. Note that a stack trace may allow for tracking a sequence of nested functions called up to the point where the stack trace is generated (e.g., when the application error occurred). The stack trace may include, for example, a root cause tag (e.g., identifying the root cause of an exception, an exception class, etc.), a stack trace tag (containing information about a calling function), a total stack tree, etc.

At 440, the error fingerprint creation platform computer processor may determine or calculate an "error fingerprint" associated with the occurrence of the application error by applying a hash function to information contained in the stack trace. By ways of examples only, the hash function might be associated with a Secure Hash Algorithm 1 ("SHA-1") and/or a Message Digest 5 ("MD5") hash function to create an error fingerprint comprising an alphanumeric string of a pre-determined length. As used herein, the phrase "hash function" may refer to any function that can be used to map data of arbitrary size to data of fixed size. The values returned by a hash function may be referred to as hash values, hash codes, digests, hashes, etc. Embodiments might also be associated with checksums, check digits, compression, randomization functions, error-correcting codes, etc.

At 450, the system may store electronic records including the indication of the error fingerprint in an application error log data store. A ticket resolution platform computer processor may then search the electronic records in the application error log data store to identify duplicate error fingerprints. According to some embodiments, the ticket resolution platform computer processor may also present a graphical interactive operator display based on information in the application error log data store. For example, the graphical interactive operator display might include an application error count grouped an error identifier, a customer identifier, a user identifier, etc.

Figure 5:
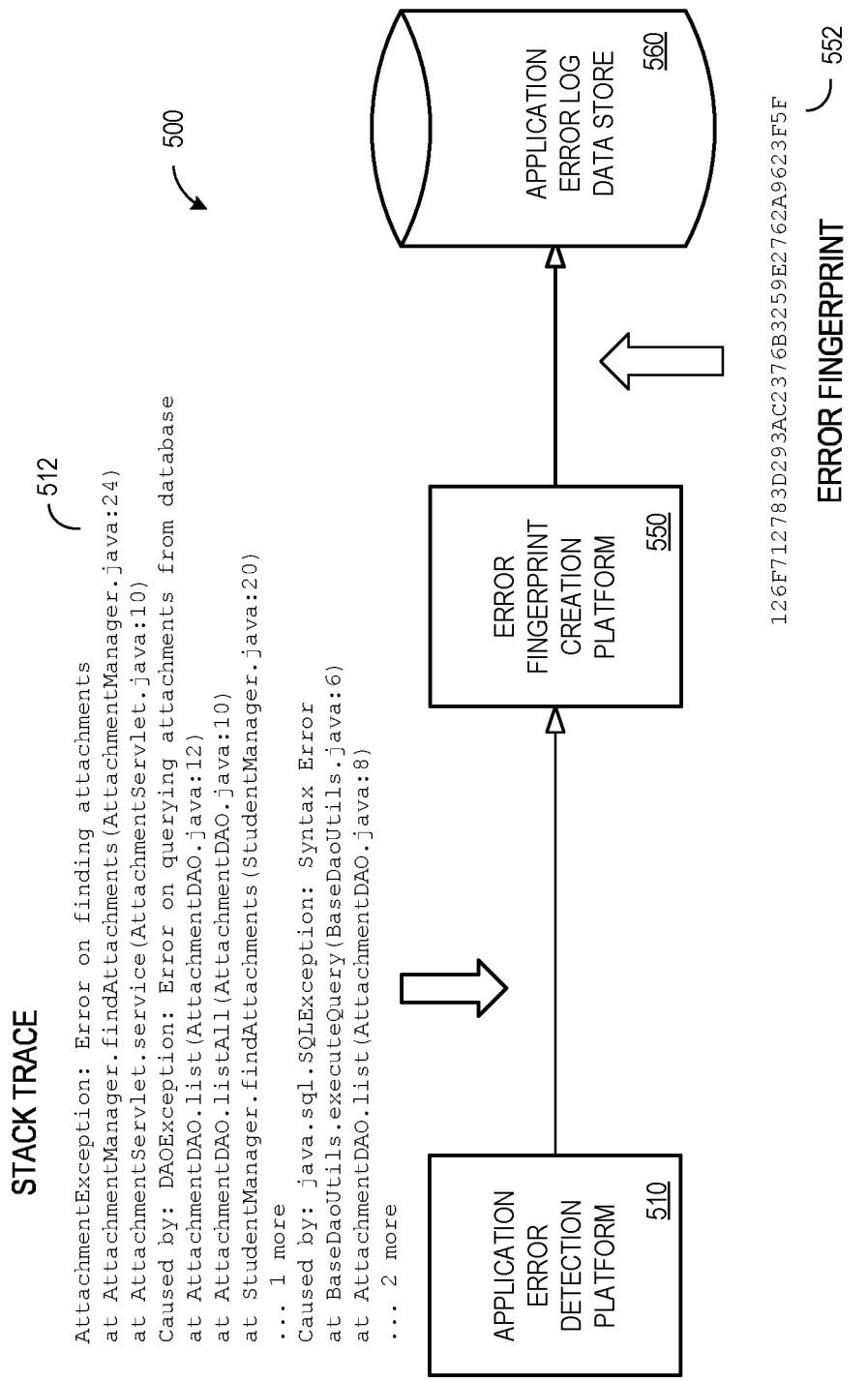
FIG. 5 is a more detailed vies of a system according to some embodiments.

FIG. 5 is a more detailed vies of a system 500 according to some embodiments. As before, an application error detection platform 510 might determine that an application error has occurred. This might comprise a customer reporting the occurrence to the application error detection platform 510, an automated detection system, etc. The system 500 may then access a tack trace 512 associated with the error, and an error fingerprint creation platform 550 may generate an error fingerprint 552 associated with the application error that can be stored into an application error log data store 560. The error fingerprint 552 should be unique enough to avoid collisions (that is, the same fingerprint 552 should not be generated for two different stack traces 512). By way of example only, the error fingerprint 552 might comprise a forty-character alphanumeric string. According to some embodiments, a major release identifier (e.g., "b1611") may be pre-pended to the hash because fingerprints most likely will not be valid after a major application release (e.g., due to the substantial amount of code changes).

A ticket resolution platform may then access the information in the application error log data store 560 to help an IT operator identify similar problems. According to some embodiments, indications of error fingerprints 552 may eventually be automatically deleted from the application error log data store 560 upon occurrence of a pre-determined event. For example, when a pre-determined number of exceptions are recorded (e.g., 2000), the system may automatically delete the half of the exceptions from the application error log data store 560 in accordance with time stamp values.

Figure 6:
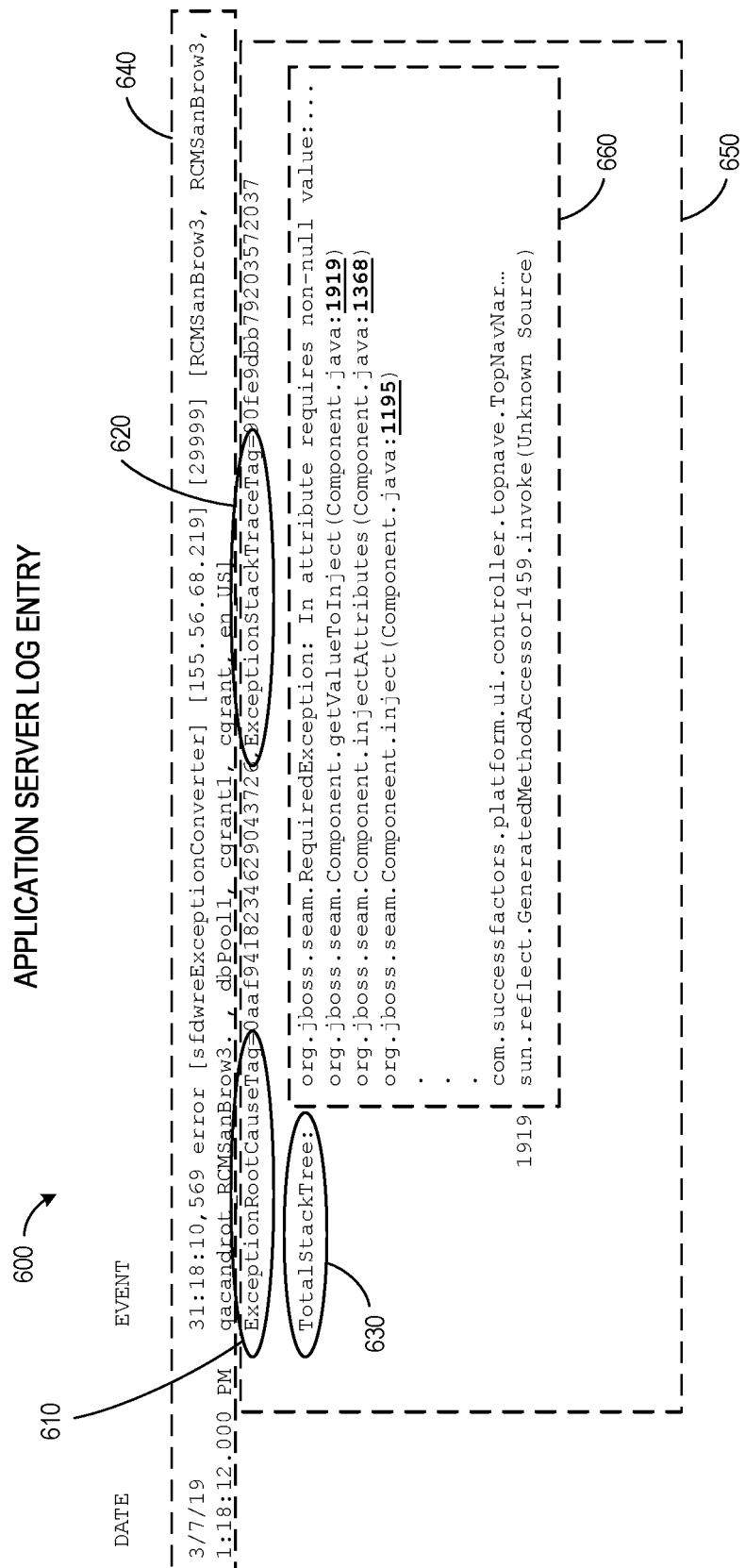
FIG. 6 illustrates an application error log entry in accordance with some embodiments.

FIG. 6 illustrates an application server log entry 600 in accordance with some embodiments. Note that the application server log entry 600 includes an ExceptionRootCauseTage 610, an ExceptionStackTraceTag 620, and a TotalStackTree 630 (that is, an actual stack trace 660). The application server log entry 600 further includes a standard logging header 640 that is used in every log entry, regardless of whether it is a fingerprint log or not. The standard logging header 640 might include, for example: a time, log type, java class, IP address, thread identifier, company, instance, database schema, database pool, username, user identifier, a locale, etc. The application log entry 600 also includes information specific to an error fingerprint and is only logged when a fingerprint is generated, including, for example, the ExceptionRootCauseTag 610 and ExceptionStackTraceTag 620 (which are determined and logged as is the TotalStackTree 630 (as described in connection with FIG. 8). According to some embodiments, software program line number data (illustrated as underlined text in FIG. 6) is removed from the information contained in the application server log entry 600 before applying the hash function. In this way, minor programing changes due to program updates will not change the error fingerprint associated with a particular problem.

Figure 7:
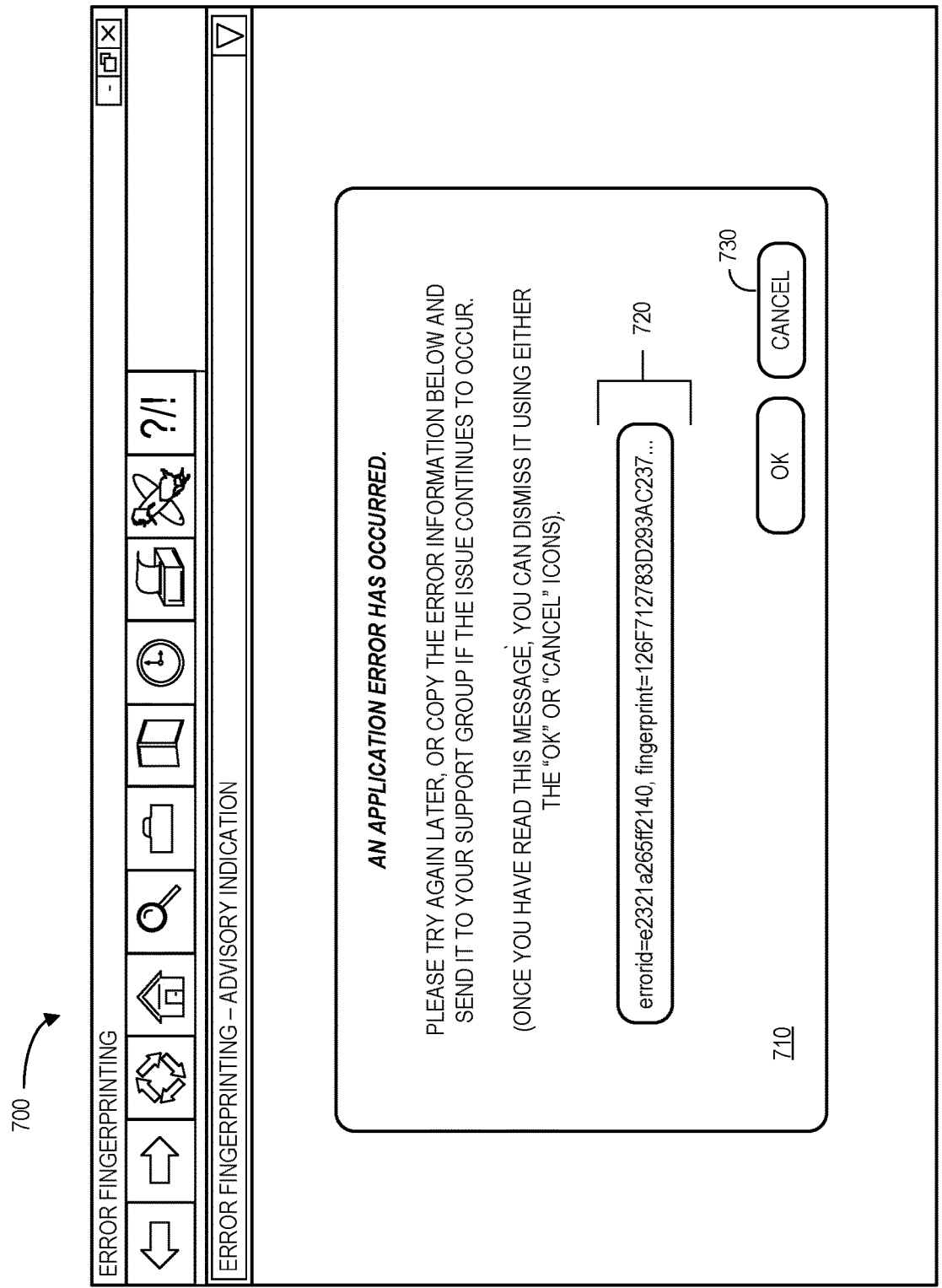
FIG. 7 is an application error display according to some embodiments.

FIG. 7 is an application error display 700 according to some embodiments. When an unhandled exception occurs, the system may automatically display an error message 710 including an automatically generated error identifier and error fingerprint 720. The user can then cut-and-past the fingerprint 720 into another application (e.g., to report the problem) and/or select one or more interactive icons 730. Note that the error identifier might be a truly unique identifier that is determined once. That is, if a user repeats a failing use case, the fingerprint 720 determined will be the same but the error identifier will be different (and may be used to track reported errors).

Figure 8:
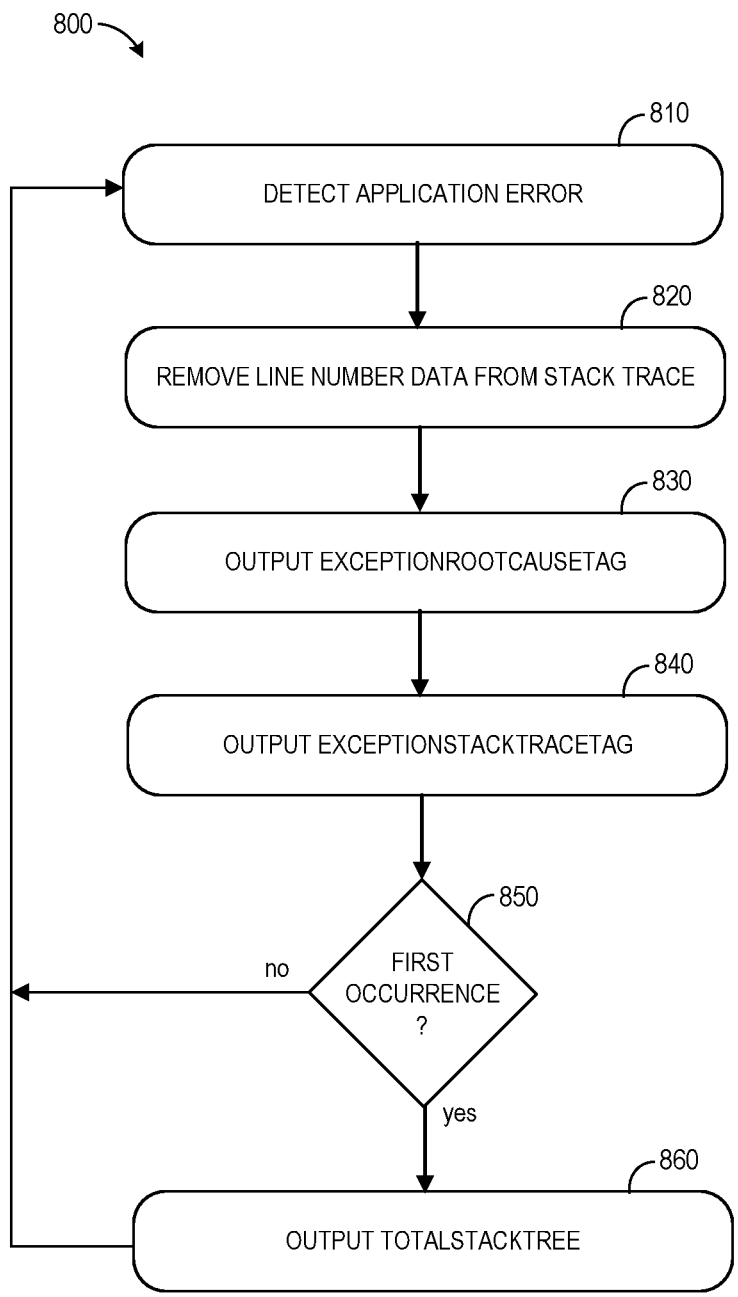
FIG. 8 is an error fingerprinting method in accordance with some embodiments.

FIG. 8 is an error fingerprinting method 800 in accordance with some embodiments. At 810, an application error is detected and line number data is removed from a stack tract at 820. The ExceptionRootCauseTag may then be output at 830 along with the ExceptionStackTraceTage at 840. If this is not the first occurrence of this type of incident at 850, the process continues at 810. If this is the first occurrence of this type of incident at 850, the TotalStackTree is also output at 860 before the process continues at 810. In this way, the overall amount of data associated with application errors may be reduced. According to some embodiments, some human-readable elements may be added to a fingerprint (e.g., to indicate where an unhandled exception originated).

Figure 9:
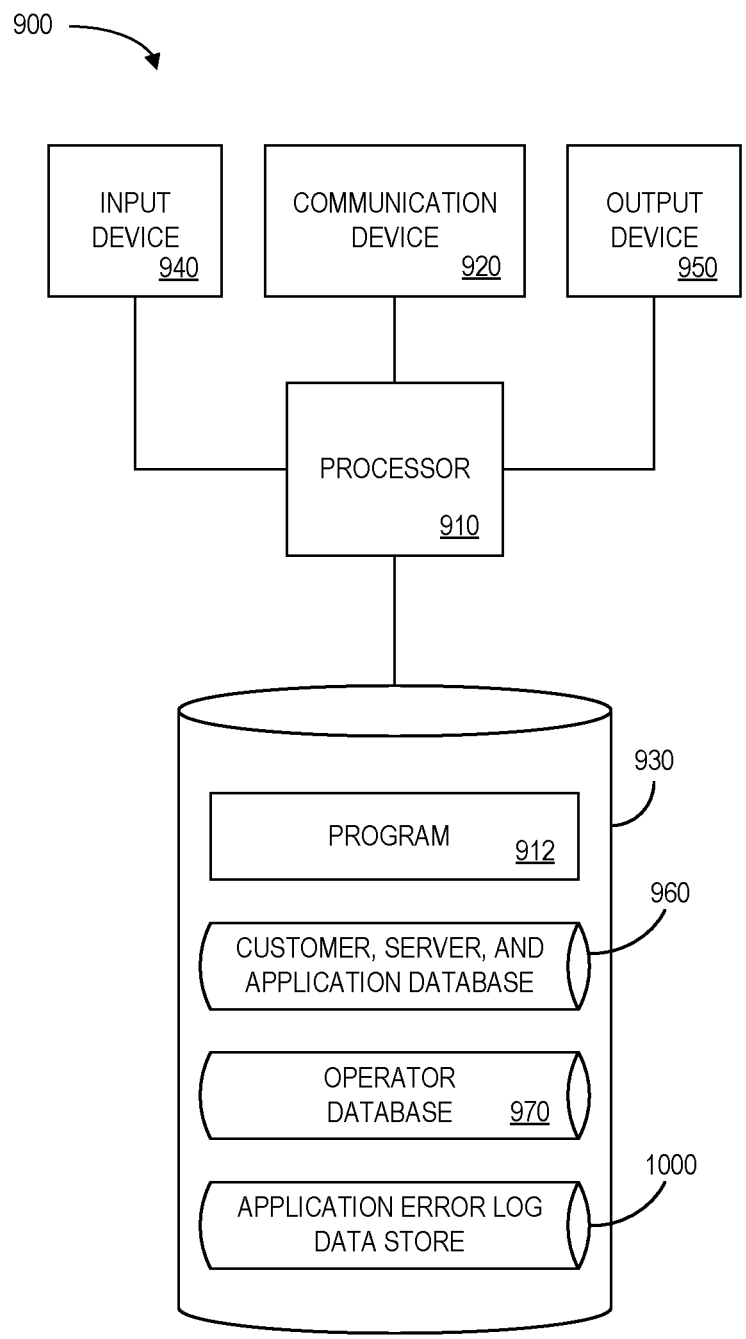
FIG. 9 illustrates a platform according to some embodiments.

Thus, embodiments may facilitate creation of an application error fingerprint to help identify similar application errors and may be implemented using any number of different hardware configurations. For example, FIG. 9 illustrates a platform 900 that may be, for example, associated with the system 600 of FIG. 6 (as well as other systems described herein). The platform 900 comprises a processor 910, such as one or more commercially available Central Processing Units ("CPUs") in the form of one-chip microprocessors, coupled to a communication device 920 configured to communicate via a communication network (not shown in FIG. 9). The communication device 920 may be used to communicate, for example, with one or more remote IT operator devices. Note that communications exchanged via the communication device 920 may utilize security features, such as those between a public internet user and an internal network of an enterprise. The security features might be associated with, for example, web servers, firewalls, and/or PCI infrastructure. The platform 900 further includes an input device 940 (e.g., a mouse and/or keyboard to enter information about application error tickets, resolution data, etc.) and an output device 950 (e.g., to output status reports, generate IT messages, etc.).

The processor 910 also communicates with a storage device 930. The storage device 930 may comprise any appropriate information storage device, including combinations of magnetic storage devices (e.g., a hard disk drive), optical storage devices, mobile telephones, and/or semiconductor memory devices. The storage device 930 stores a program 912 and/or network security service tool or application for controlling the processor 910. The processor 910 performs instructions of the program 912, and thereby operates in accordance with any of the embodiments described herein. For example, the processor 910 may monitor execution of an application for a customer and determine that an application error has occurred. Responsive to the determination that an application error has occurred, the processor 910 may access a stack trace representing execution of the application when the application error occurred. An error fingerprint associated with the occurrence of the application error may then be determined by the processor 910 a hash function (e.g., SHA-1) to information contained in the stack trace. Electronic records including an indication of the error fingerprint may then be stored by the processor 910 and/or searched for duplicates to facilitate application error resolution.

The program 912 may be stored in a compressed, uncompiled and/or encrypted format. The program 912 may furthermore include other program elements, such as an operating system, a database management system, and/or device drivers used by the processor 910 to interface with peripheral devices.

As used herein, information may be "received" by or "transmitted" to, for example: (i) the platform 900 from another device; or (ii) a software application or module within the platform 900 from another software application, module, or any other source.

In some embodiments (such as shown in FIG. 9), the storage device 930 further stores customer, server, and application database information 960, operator database information 970 and an application error log data store 1000. An example of a database that might be used in connection with the platform 900 will now be described in detail with respect to FIG. 10. Note that the database described herein is only an example, and additional and/or different information may be stored therein. Moreover, various databases might be split or combined in accordance with any of the embodiments described herein. For example, the operator database 970 and/or the application error log data store 1000 might be combined and/or linked to each other within the program 912.

Figure 10:
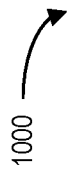
FIG. 10 is a tabular portion of an application error log data store in accordance with some embodiments.

Referring to FIG. 10, a table is shown that represents the application error log data store 1000 that may be stored at the platform 900 in accordance with some embodiments. The table may include, for example, entries identifying problems that occurred in connection with execution of an application. The table may also define fields 1002, 1004, 1006, 1008, 1010, 1012 for each of the entries. The fields 1002, 1004, 1006, 1008, 1010, 1012 may, according to some embodiments, specify: an error identifier 1002, a date and time 1004, an application identifier 1006, a customer identifier 1008, an error fingerprint 1010, and a status 1012. The application error log data store 1000 may be created and updated, for example, in substantially real time during execution of applications for customers.

The error identifier 1002 may be, for example, a unique alphanumeric code identifying a particular problem that occurred during execution of an application (e.g., occurrence of an unhandled exception). The data and time 1004 might indicate when the error occurred, and the application identifier 1006 might indicate the program that experienced the error (e.g., an HR application, payroll portal, etc.). The customer identifier 1008 might indicate who experienced the error (and in some cases, might include a host server identifier, user identifier, etc.) and the error fingerprint 1010 might represent the value determined in accordance with any of the embodiments described herein. The status 1012 might indicate that the problem is still pending, has been resolved, etc. As illustrated by the third entry in the data store 1000, the status might also indicate that the error has been identified as being identical (or similar) to another error. In particular, the problem associated with error identifier 1002 "E_103" has been matched with error "E_101" because they both have identical error fingerprints 1010.

Figure 11:
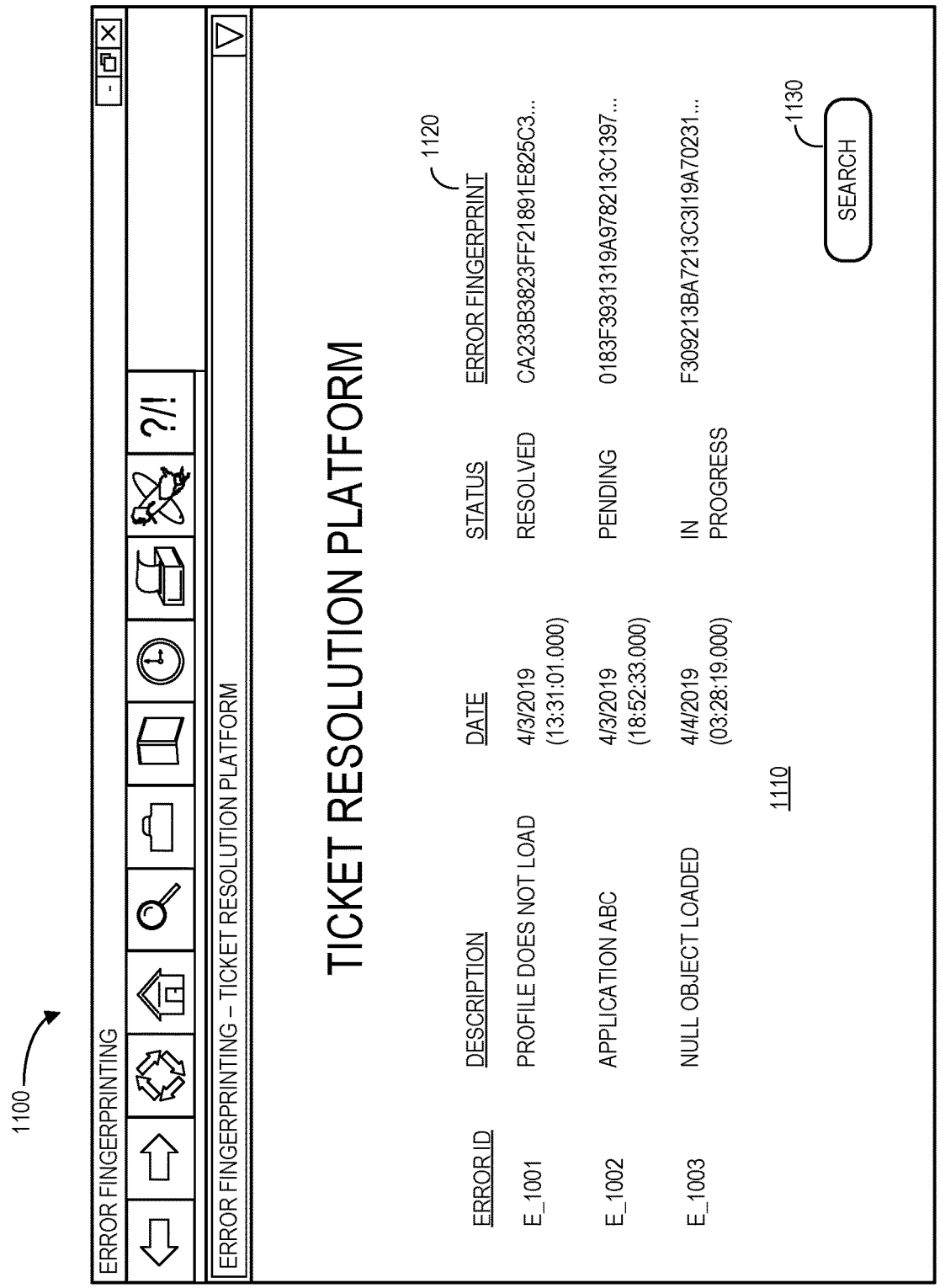
FIG. 11 is an example of a ticket resolution display according to some embodiments.
Figure 12:
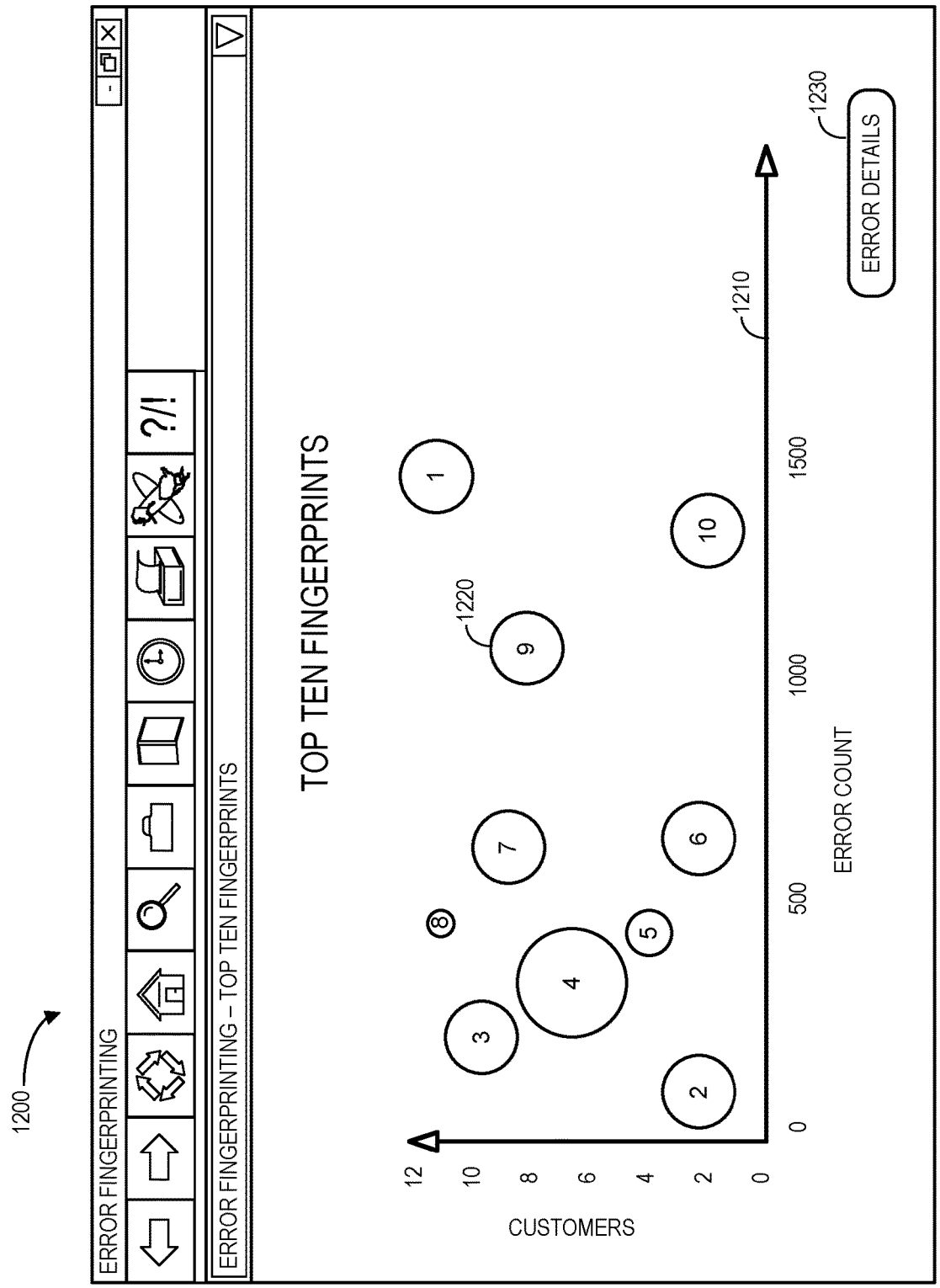
FIG. 12 is an example of a top ten application error display in accordance with some embodiments.

The information in the data store 1000 may be used to generate various displays for an administrator, IT operator, etc. For example, FIG. 11 is an example of a ticket resolution display 1100 according to some embodiments. The ticket resolution display 1100 includes a data output portion 1110 display an error identifier, description, data and time, status, error fingerprint 1120, etc. Selection of a "search" icon 1130 (e.g., via a computer mouse or touchscreen) may let an operator look for error having identical fingerprints 1120. FIG. 12 is an example of a "top ten" application error display 1200 in accordance with some embodiments. That is, error fingerprints may be used to determine how often each different type of error has occurred. This information may be displayed on a graph 1210 have an error count axis and a customer axis as a circle 1220 having a radius associate with a number of servers or user who have experienced that problem. Such a display 1200 might be used to determine mode details 1230 about an error and/or to allocate resources (e.g., by assigning a higher priority to problems that are more frequently for a large number of users).

Figure 13:
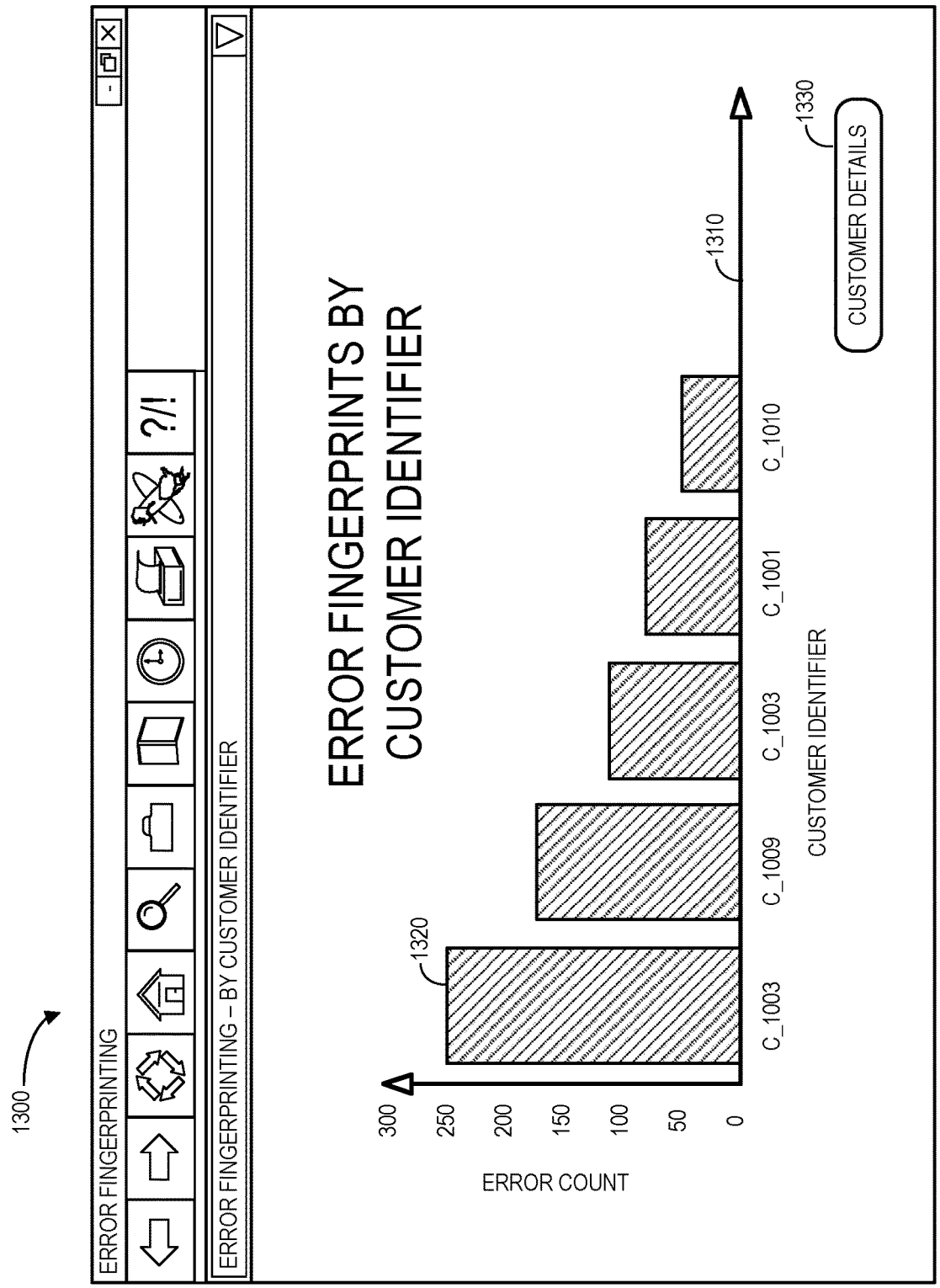
FIG. 13 is an example of an application error display sorted by customer identifier according to some embodiments.
Figure 14:
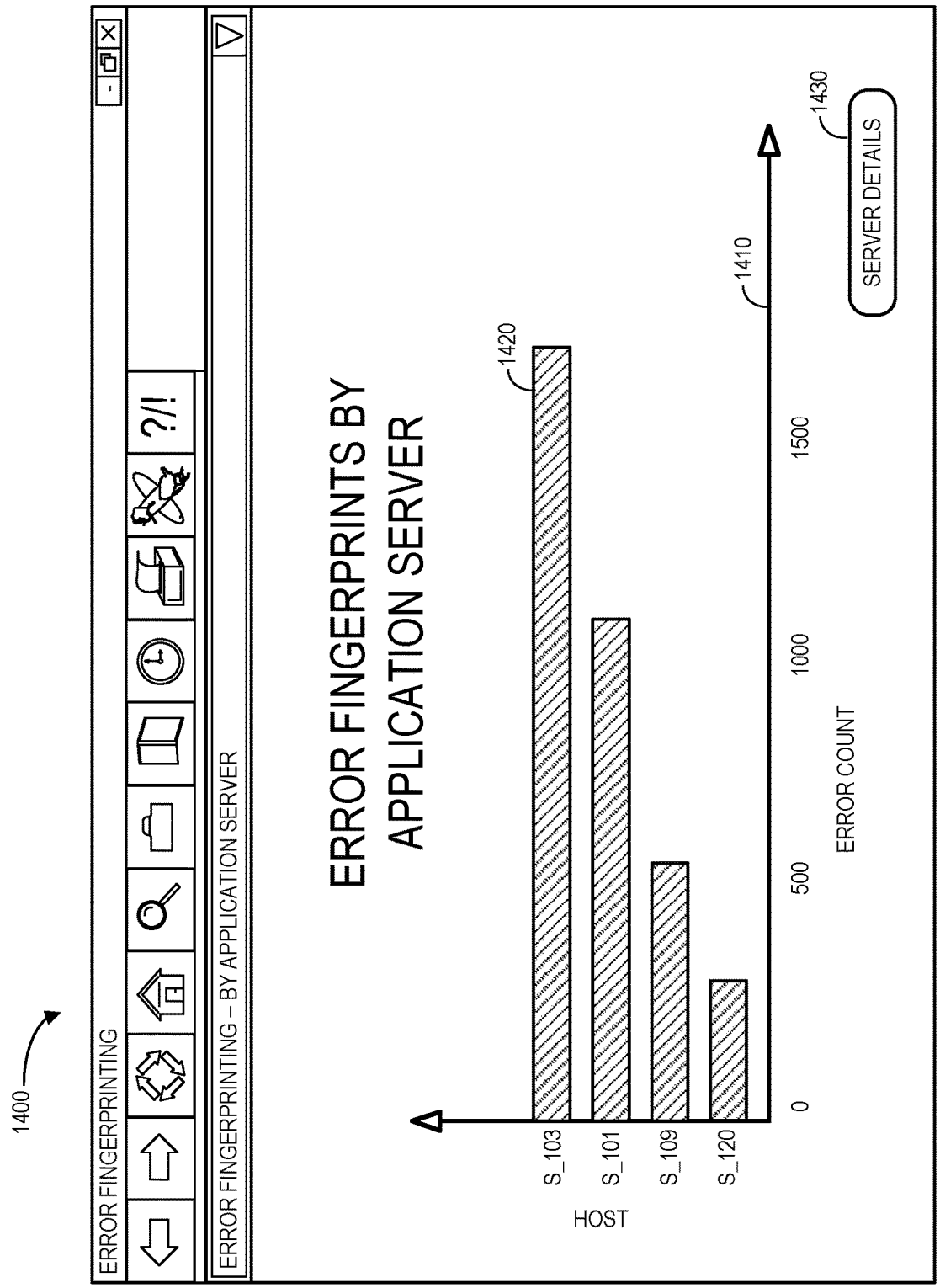
FIG. 14 is an example of an application error display sorted by application server in accordance with some embodiments.
Figure 15:
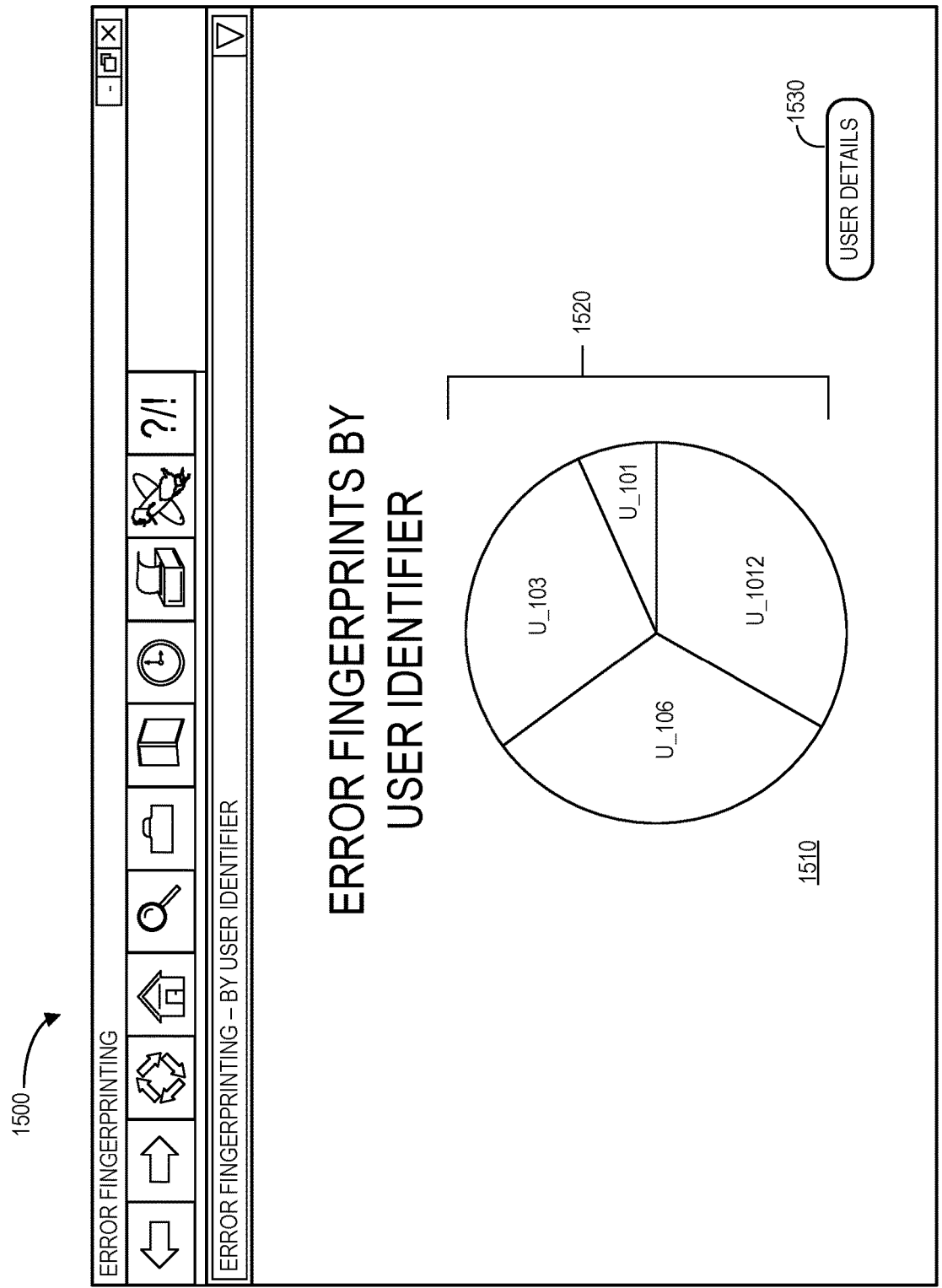
FIG. 15 is an example of an application error display sorted by user identifier according to some embodiments.

FIG. 13 is an example of an application error display 1300 sorted by customer identifier according to some embodiments. The display 1300 may include a graph 1310 having a customer axis and an error count axis to help identify those customers that are experiencing the greatest number of problems 1320 (e.g., customer "C_1003" in FIG. 13) and to view more details 1330 about that customer. FIG. 14 is an example of an application error display 1400 sorted by application server in accordance with some embodiments. The display 1400 may include a graph 1410 having an error count axis and a host server axis to help identify those servers that are experiencing the greatest number of problems 1420 (e.g., host server "S_103" in FIG. 14) and to view more details 1430 about those servers. FIG. 15 is an example of an application error display 1500 sorted by user identifier according to some embodiments. The display 1500 may include data output area 1510 including a pie chart 1520 indicating which users are experiences the most number of problems along with further details 1530 about a selected user.

Figure 16:
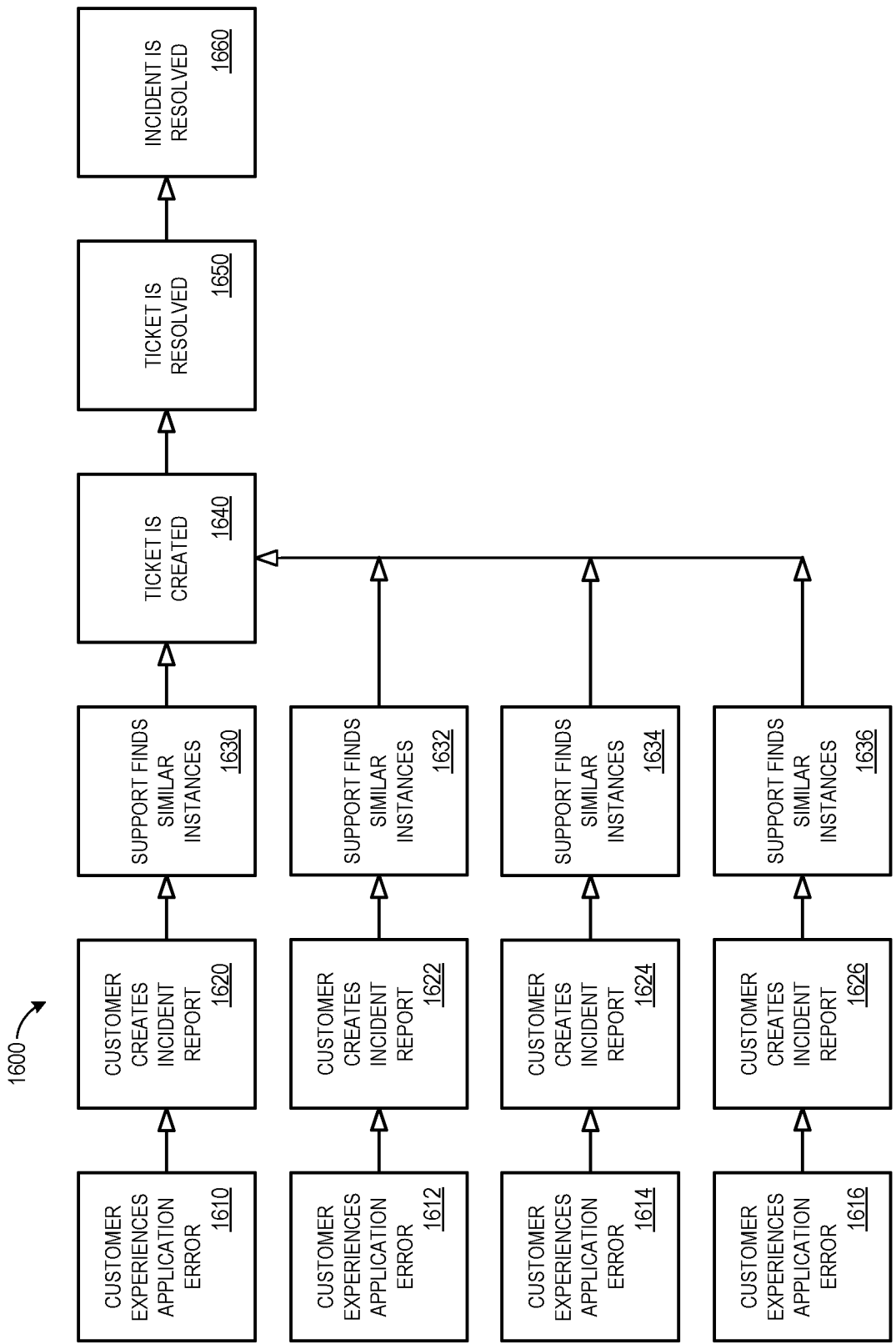
FIG. 16 illustrates an application error resolution process for multiple errors in accordance with some embodiments.

FIG. 16 illustrates an application error resolution process 1600 for multiple errors in accordance with some embodiments. As with FIG. 2, at 1610 a customer may experience an application error, and at 1620 the customer may create an incident report. At 1630, the enterprise may search for similar instances (to avoid duplicating debugging efforts). As illustrated in FIG. 16, these steps can be repeated multiple times when customers experience multiple errors (e.g., at steps 1612, 1614, 1616, etc.). Because error fingerprints in accordance with any of the embodiments described herein are utilized, it may be determined that all four incidents are in fact associated with a single problem. As a result, at 1640 only a single application error ticket is created. Similarly, only a single ticket needs to be resolved at 1650 before the incident is resolved at 1660.

Thus, some embodiments described herein may provide technical advantages, including an ability to determine how many times a customer has experienced the same issue as well as whether or not other customers are also experiencing that issue. This will prevent duplicate tickets, reduce the workload on an IT operator, and improve enterprise response times to customer problems.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information described herein may be combined or stored in external systems).

Figure 17:
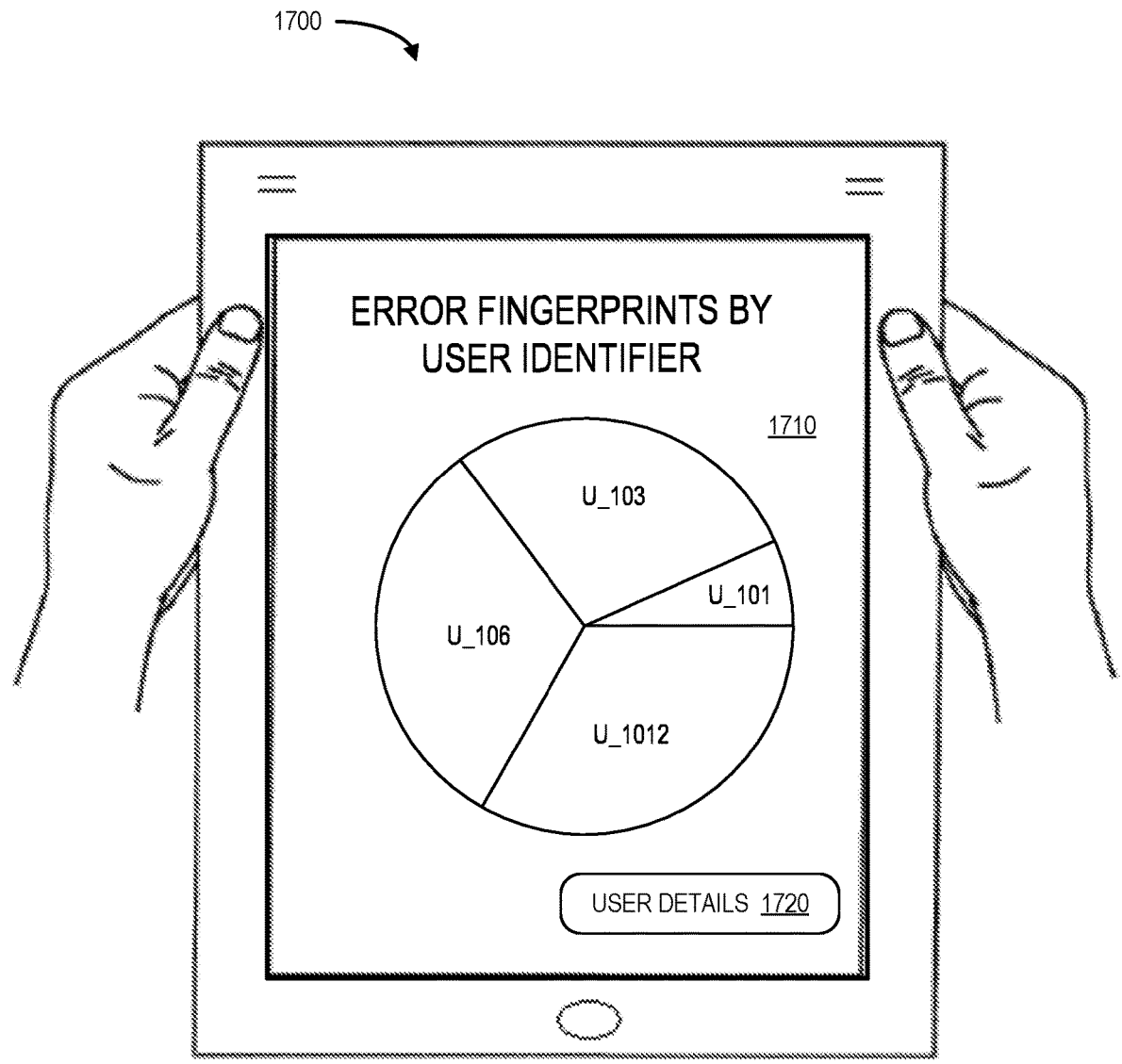
FIG. 17 illustrates a tablet computer providing a display according to some embodiments.

Similarly, the displays shown and described herein are provided only as examples, and other types of displays and display devices may support any of the embodiments. For example, FIG. 17 illustrates a tablet computer 1700 with error fingerprint display 1710 that might utilize a graphical user interface. The display 7510 might include a depiction how often users are experiencing a particular problem (having a particular fingerprint). Note that selection of an element on the display 1710 might result in a display of further information about that element. Moreover, the display 1710 might comprise an interactive user interface (e.g., via a touchscreen) and includes a "user details" 1720 icon in accordance with any of the embodiments described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:
1. A system to facilitate application error resolution, comprising:

an application error detection platform computer processor adapted to:
monitor execution of an application on a plurality of application servers for a plurality of customers, wherein each customer is associated with multiple users, and determine that an application error has occurred;
an error fingerprint creation platform computer processor, coupled to the application error detection platform, adapted to:
responsive to the determination that an application error has occurred, access a stack trace representing execution of the application when the application error occurred, wherein the stack trace includes all of: (i) a root cause tag, (ii) stack trace tag, and (iii) a total stack tree, determine an error fingerprint associated with the occurrence of the application error by applying a hash function to information contained in the stack trace to create a string comprising alphanumeric characters, and output an indication of the error fingerprint;
an application error log data store, coupled to the error fingerprint creation platform, adapted to receive and store electronic records including the indication of the error fingerprint; and a ticket resolution platform computer processor, coupled to the application error log data store, adapted to:
search the electronic records to identify duplicate error fingerprint alphanumeric strings, and present a graphical interactive operator display based on information in the application error log data store including a graphical element for each of a plurality of error fingerprints, each graphical element illustrating a total application error count for that particular error fingerprint and a number of customers, each associated with multiple users, who experienced that particular error fingerprint.

2. The system of claim 1, wherein the hash function is associated with at least one of a Secure Hash Algorithm 1 ("SHA-1") and a Message Digest 5 ("MD5") hash function.

3. The system of claim 1, wherein the string is of a pre-determined length.

4. The system of claim 1, wherein the application error is associated with a runtime exception.

5. The system of claim 4, wherein the error fingerprint creation platform computer processor removes code line number data from the information contained in the stack trace before applying the hash function.

6. The system of claim 1, wherein indications of error fingerprints are automatically deleted from the application error log data store upon occurrence of a pre-determined event.

7. A computerized method to facilitate application error resolution, comprising:
monitoring, by an application error detection platform computer processor, execution of an application on a plurality of application servers for a plurality of customers, wherein each customer is associated with multiple users; determining, by the application error detection platform computer processor, that an application error has occurred;
responsive to the determination that an application error has occurred, accessing, by an error fingerprint creation platform computer processor, a stack trace representing execution of the application when the application error occurred, wherein the stack trace includes all of: (i) a root cause tag, (ii) stack trace tag, and (iii) a total stack tree; determining, by the error fingerprint creation platform computer processor, an error fingerprint associated with the occurrence of the application error by applying a hash function to information contained in the stack trace to create a string comprising alphanumeric characters; and storing electronic records including the indication of the error fingerprint in an application error log data store;

searching the electronic records, by a ticket resolution platform computer processor, to identify duplicate error fingerprint strings; and presenting a graphical interactive operator display based on information in the application error log data store including a graphical element for each of a plurality of error fingerprints, each graphical element illustrating a total application error count for that particular error fingerprint and a number of customers, each associated with multiple users, who experienced that particular error fingerprint.

8. The method of claim 7, wherein the hash function is associated with at least one of a Secure Hash Algorithm 1 ("SHA-1") and a Message Digest 5 ("MD5") hash function.

9. The method of claim 7, wherein the string is of a pre-determined length and the application error is associated with a runtime exception.

10. The method of claim 9, wherein the error fingerprint creation platform computer processor removes code line number data from the information contained in the stack trace before applying the hash function.

11. A non-transitory, computer-readable medium storing instructions that, when executed by a computer processor, cause the computer processor to perform a method to facilitate application error resolution, the method comprising:

monitoring execution of an application on a plurality of application servers for a plurality of customers, wherein each customer is associated with multiple users;

determining that an application error has occurred;

responsive to the determination that an application error has occurred, accessing a stack trace representing execution of the application when the application error occurred, wherein the stack trace includes all of: (i) a root cause tag, (ii) stack trace tag, and (iii) a total stack tree;

determining an error fingerprint associated with the occurrence of the application error by applying a hash function to information contained in the stack trace to create a string comprising alphanumeric characters; storing electronic records including the indication of the error fingerprint in an application error log data store;

searching, by a ticket resolution platform computer processor, the electronic records to identify duplicate error fingerprint strings; and presenting a graphical interactive operator display based on information in the application error log data store including a graphical element for each of a plurality of error fingerprints, each graphical element illustrating a total application error count for that particular error fingerprint and a number of customers, each associated with multiple users, who experienced that particular error fingerprint.

12. The medium of claim 11, wherein indications of error fingerprints are automatically deleted from the application error log data store upon occurrence of a pre-determined event.

13. The system of claim 1, wherein a size of each graphical element indicates an overall number of users that experienced the particular error fingerprint.

14. The system of claim 1, wherein a size of each graphical element indicates an overall number of servers that experienced the particular error fingerprint.

\* \* \* \* \*